United States Patent Office 2,924,629

Patented Feb. 9, 1960

2,924,629

ISOMERIZATION PROCESS

George R. Donaldson, Barrington, Ill., assignor, by mesne assignments, to Universal Oil Products Company, Chicago, Ill., a corporation of Delaware No Drawing. Application October 19, 1956
Serial No. 616,933

20 Claims. (Cl. 260—666)

This invention relates to the isomerization of an isomerizable compound and more particularly relates to a combination process in which a novel catalytic composition can be utilized to effect the desired isomerization. Still more particularly, this invention relates to a combination process in which an isomerizable compound containing minor quantities of impurities is first treated to remove said impurities followed by isomerization in the presence of a novel catalytic composition sensitive to said impurities.

In recent years with the advances in the automotive industry, fuels of relatively high octane rates have been found necessary. Many methods have been provided for the production of high antiknock fuels. These methods include such processes as alkylation, catalytic reforming, catalytic cracking, and high temperature thermal cracking and reforming operations. Other processes which may be considered in one sense auxiliary were developed, for example, isomerization which was employed to produce isoparaffins which subsequently were reacted with olefins to form a high octane number motor fuel fraction, commonly termed alkylate. In addition to the production of one of the reactants for alkylation, isomerization was also utilized to increase the antiknock quality of saturated hydrocarbons such as paraffins and naphthenes found in selected fractions of gasolines and naphthas. An example of the latter type of operation is a process in which pentane and/or hexane fractions are isomerized to produce isopentanes and/or isomeric hexanes, respectively, which subsequently may be employed as blending stocks for automotive and aviation fuels.

In most of the above mentioned isomerization processes, catalytic agents are employed to effect the desired rearrangement. Ordinarily, these catalytic agents consist of metal halides, such as aluminum chloride, aluminum bromide, etc., which are activated by the addition of the corresponding halide. These catalytic agents are very active and effect high conversion per pass of such compounds as n-butane. However, the activity of these catalysts is so high that the catalysts accelerate decomposition reactions as well as isomerization reactions with the result that the ultimate yield of isomerized product is reduced. This is particularly true as the molecular weight of the isomerizable compound increases through a homologous series, such as in going from n-butane through n-pentane and n-hexane to n-heptane. This cracking also considerably increases catalyst consumption by reaction of fragmental materials with the catalytic agent to form sludge-like material. In spite of what might have been predicted, these decompositions and/or cracking reactions cannot be reduced by simply lowering the reaction zone severity, for example, by reducing temperature or by increasing liquid hourly spaced velocity. At temperatures and space velocities at which satisfactory isomerization reactions are obtained, these reactions are pronounced. Recent developments in the field of isomerization in order to improve the antiknock characteristics of saturated hydrocarbons or to produce a reactant for catalytic alkylation have been directed to the use of a novel catalytic agent which can be more effectively employed. More particularly, these catalytic agents comprise calcined composites of a Friedel-Crafts metal halide and a composite of a refractory oxide containing a hydrogenation component. A particularly preferred catalyst of this general type is a catalyst comprising a calcined composite of a Friedel-Crafts metal halide and a composite of a refractory metal oxide containing a platinum group metal. A still more particularly preferred catalyst of this general type is a catalyst comprising a calcined composite of a Friedel-Crafts aluminum halide and a composite of gamma-alumina containing platinum. While the alumina is used as a support in the catalyst utilized in the process of the present invention, the alumina has functions other than as a support which functions will be set forth hereinafter in detail. The use of such a catalyst results in high conversions of isomerizable compounds to desired isomers thereof in the absence of catalyst activators, such as hydrogen halides, which have previously been considered necessary along with a metal halide of the Friedel-Crafts type. However, these novel catalysts have been found to be susceptible to deactivation due to minor amounts of impurities naturally occurring in isomerizable compound feed stocks utilized in such conversion processes. I have found a method by the use of which the life of such novel catalytic agents can be greatly extended. This and other objects of the combination process of the present invention will be set forth hereinafter in detail.

In one embodiment, my invention relates to a process for the isomerization of an isomerizable organic compound containing isomerization catalyst deactivating quantities of compounds of oxygen, nitrogen, and sulfur which comprises treating said compound with a treating agent at treating conditions, and contacting said compound at isomerization conditions with a catalyst prepared by vaporizing a Friedel-Crafts metal halide onto a composite of a refractory oxide containing a hydrogenation component, and heating said thus formed composite at a temperature above about 300° C. for a time sufficient to remove therefrom any unreacted Friedel-Crafts metal halide.

In a more specific embodiment, my invention relates to a process for the isomerization of an isomerizable saturated hydrocarbon containing isomerization catalyst deactivating quantities of compounds of oxygen, nitrogen, and sulfur which comprises treating said hydrocarbon with a treating agent at treating conditions, and contacting said hydrocarbon at isomerization conditions with a catalyst prepared by vaporizing a Friedel-Crafts metal halide onto alumina containing a hydrogenation component, and heating said thus formed composite at a temperature above about 300° C. for a time sufficient to remove therefrom any unreacted Friedel-Crafts metal halide.

In a still further embodiment, my invention relates to a process for the isomerization of an isomerizable saturated hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions with a catalyst prepared by vaporizing a Friedel-Crafts aluminum halide onto a composite of platinum and alumina and heating said thus formed composite at a temperature above about 300° C. for a time sufficient to remove therefrom any unreacted Friedel-Crafts aluminum halide.

In another embodiment, my invention relates to a process for the isomerization of an isomerizable acyclic paraffin hydrocarbon containing isomerization catalyst deactivating quantities of compounds of oxygen, nitrogen, and sulfur which comprises treating said hydrocarbon at treating conditions with hydrogen, a drying agent, and contacting said hydrocarbon at isomerization conditions with a catalyst prepared by subliming aluminum chloride onto a composite of platinum and alumina, and heating said thus formed composite at a temperature of from about 400° C. to about 600° C. for a time of from about 1 to about 48 hours to remove therefrom any unreacted aluminum chloride.

In a specific embodiment, my invention relates to a process for the isomerization of n-butane containing isomerization catalyst deactivating quantities of compounds of oxygen, nitrogen, and sulfur which comprises treating said n-butane at treating conditions with hydrogen in the presence of a hydrogenation component, a drying agent, and contacting said n-butane at isomerization conditions with a catalyst prepared by subliming aluminum chloride onto a composite of platinum and gamma-alumina, and heating said thus formed composite at a temperature of from about 400° C. to about 600° C. for a time of from about 1 to about 48 hours to remove therefrom any unreacted aluminum chloride.

In another specific embodiment, my invention relates to a process for the isomerization of n-pentane containing isomerization catalyst deactivating quantities of compounds of oxygen, nitrogen, and sulfur which comprises treating said n-pentane with hydrogen in the presence of a hydrogenation catalyst, a drying agent, and contacting said n-pentane at isomerization conditions with a catalyst prepared by subliming aluminum chloride onto a composite of platinum and alumina, and heating said thus formed composite at a temperature of from about 400° C. to about 600° C. for a time of from about 1 to about 48 hours to remove therefrom any unreacted aluminum chloride.

In an additional specific embodiment, my invention relates to a process for the isomerization of n-hexane at treating conditions with hydrogen in the presence of a hydrogenation catalyst, a drying agent, and contacting said n-hexane at isomerization conditions with a catalyst prepared by subliming aluminum chloride onto a composite of platinum and alumina, and heating said thus formed composite at a temperature of from about 400° C. to about 600° C. for a time from about 1 to about 48 hours to remove therefrom any unreacted aluminum chloride.

The process of my invention is especially applicable to the isomerization of isomerizable saturated hydrocarbons including acyclic paraffins and cyclic naphthenes, and is particularly suitable for the isomerization of straight-chain and mildly branched chain paraffins containing 4 or more carbon atoms per molecule, including n-butane, n-pentane, n-hexane, n-heptane, n-octane, etc.; or cycloparaffins ordinarily containing at least 5 carbon atoms in the ring such as alkylcyclopentanes, and cyclohexanes, including methylcyclopentane, dimethylcyclopentane, cyclohexane, methylcyclohexane, dimethylcyclohexanes, etc. It is also applicable to the conversion of mixtures of paraffins and/or naphthenes such as those derived by selective fractionation and distillation of straight-run or natural gasolines and naphthas. Such mixtures of paraffins and/or naphthenes include so-called pentane fractions, n-hexane fractions, and mixtures thereof. The process of my invention is also suitable for the isomerization of olefins, for example, the isomerization of 1-butene to 2-butene, etc., the isomerization of 3-methyl-1-butene to 2-methyl-2-butene, etc. The process may also be used for the isomerization of alkylaromatic hydrocarbons, for example, the isomerization of ethylbenzene to dimethylbenzene or xylene, the isomerization of propylbenzene to methylethylbenzene or trimethylbenzene, etc. Suitable modifications in operating conditions may be necessary when the process is utilized for other than the isomerization of saturated hydrocarbons and therefore these various processes are not necessarily equivalent.

As set forth hereinabove, the process of my invention is especially applicable to the isomerization of saturated hydrocarbons such as n-butane, n-pentane, n-hexane, etc. Furthermore, these saturated hydrocarbons are usually derived as selective fractions from various naturally occurring petroleum streams. For example, they may be separated as individual components or as certain boiling range fractions by selective fractionation and distillation of straight run or natural gasolines and naphthas. It is well known that such petroleum streams contain varying minor quantities of impurities including metals, and compounds of oxygen, nitrogen, and sulfur. While the presence of some of these compounds has been previously noted, no particular attempt has been made to remove such compouunds from these hydrocarbon fractions prior to the use thereof in isomerization processes. For example, aluminum chloride supported on bauxite along with hydrogen chloride has been shown to be an effective isomerization catalyst. However, the consumption of aluminum chloride in processes utilizing such a catalyst has been extremely high, for example, in the neighborhood of one pound of aluminum chloride per hundred gallons of product. This has mainly been due to the formation of large quantities of sludge-like materials which are formed due to the uncontrollable high activity of such a catalyst. Since the formation of these large quantities of sludge-like materials are inherent in the use of such a catalyst, minor quantities of impurities in the feed stocks to such processes have been ignored. As an example, it is well known that water reacts with anhydrous aluminum chloride. However, the quantities of water or other compounds of oxygen, which normally occur in these feed stocks is very low. This reaction of water with anhydrous aluminum chloride destroys the aluminum chlorides as a catalyst. However, the amounts of sludge-like material formed in such processes are so high that this reaction has been so inconsequential that it has gone unnoticed. With the development of newer types of isomerization catalysts, the formation of sludge-like materials has been greatly reduced and in some instances for all practical purposes eliminated. However, it is necessary for these new catalysts to have relatively long useful lives so that their increased costs, and other costs due to their use, may be justified economically.

Various compounds of oxygen, nitrogen, and sulfur act as isomerization catalysts deactivating materials and thus are preferably removed prior to contacting such isomerizable saturated hydrocarbons with these recently developed catalytic agents. Compounds of oxygen which are detrimental to long catalyst life and activity include water, alcohols such as methyl alcohol, ethyl alcohol, propyl alcohols, butyl alcohols, amyl alcohols, etc., ethers such as dimethyl ether, methylethyl ether, diethyl ether, etc., aldehydes such as formaldehyde, acetaldehyde, propionaldehyde, butyraldehydes, etc., ketones, such as acetone, methylethyl ketone, diethyl ketone, etc., acids such as formic acid, acetic acid, propionic acid, butyric acids, and methyl and other esters thereof, etc., cyclic compounds such as furan, dihydrofuran, tetrahydrofuran, pyran, dihydropyran, tetrahydropyran, etc., phenol, etc., and other compounds in which the oxygen may occur either as part of the cyclic ring system or a side chain. Compounds of sulfur which are detrimental include hydrogen sulfide, mercaptans such as methyl mercaptan, ethyl mercaptan, propyl mercaptans, butyl mercaptans, amyl mercaptans, etc., thioethers such as dimethyl sulfide, methylethyl sulfide, diethyl sulfide, etc., disulfides such as dimethyl disulfide, methylethyl disulfide, diethyl disulfide, etc., thioaldehydes and thioketones, thioacids and esters thereof, and cyclic compounds including thiophene, dihydrothiophene, tetrahydrothiophene, thiapyran, dihydrothiapyran, tetrahydrothiapyran, thiophenol, etc. Compounds of nitrogen which are detrimental include ammonia, amines such as methyl amine, ethyl amine, propyl amines, butyl amines, amyl amines, dimethyl amine, diethyl amine, trimethyl amine, amides such as formamide, acetamide, etc., cyclic compounds such as pyrrole, dihydropyrrole, tetrahydropyrrole, pyridine, etc. Since the various compounds of oxygen, nitrogen, and sulfur are present in the preferred saturated hydrocarbon feed stocks for the process of this invention in such small quantities, their exact nature has not been determined. However, their effect on the recently developed isomerization catalysts is very pronounced and thus as set forth hereinabove, it is desirable and, in fact, necessary to remove such impurities prior to contact of and subsequent deactivation of the catalyst with feed stocks containing these impurities. By use of the novel process of this invention, as set forth hereinafter, these compounds of oxygen, nitrogen, and sulfur are eliminated and a continuous and economical process results therefrom.

In the first step in the process of my invention the isomerizable organic compound containing isomerization catalyst deactivating quantities of compounds of oxygen, nitrogen, and sulfur is treated with a treating agent at treating conditions. Since water and compounds of oxygen appear to be extremely detrimental, this treating step comprises in its most simple embodiment drying. This drying can be accomplished, if water is the only compound of oxygen sought to be removed, by distillation drying. The drying may also be accomplished by treating the isomerizable compound with a suitable drying agent, said drying agent comprising either a liquid or a solid. Suitable liquid drying agents include calcium chloride solutions, glycerol, glycols, such as diethylene glycol and triethylene glycol, with or without added ethanol amine for hydrogen sulfide removal, lithium chloride solutions, liquid phosporic acid which may or may not contain free phosphorous pentoxide, sodium hydroxide, potassium hydroxide, concentrated sulfuric acid, etc. Insoluble or solid drying agents include such diverse materials as activated alumina, bauxite which is sold under trade names as Fluorite, Porocel, Driocel, etc., calcium sulfate or Drierite, metallic sodium, metallic potassium, calcium oxide, magnesium oxide, calcium hydride, barium oxide, silica gel, phosphoric acid impregnated on a suitable carrier such as a siliceous adsorbent and known in the art as solid phosphoric acid, etc. These drying agents will be utilized in a treating zone and disposed therein as liquid or solids as the case may be. The drying zone may also comprise one or more individual zones so that one drying zone may be in the process of regeneration while one or more of the others is in use. The drying zone or treating zone is maintained at suitable treating conditions of temperature and pressure so that adequate and complete drying of the feed stock takes place. Such temperatures and pressures will range from about 0° C. to about 300° C. and the pressure will range from about atmospheric to about 1000 pounds per square inch or more. The isomerizable compound is passed through such a zone at a space velocity such that adequate contacting is attained, suitable space velocities ranging from about 0.1 to about 1000 or more. The exact conditions utilized are, of course, dependent upon the particular drying agent selected. The drying agents set forth hereinabove are not necessarily equivalent and by the enumeration thereof, no intention is meant to infer any such equivalency.

As stated hereinabove, this drying step will be the minimum treating utilized. However, it may be utilized in combination with other treating steps the combination of which steps for the purposes of this application is simply called treating. Other steps which may be utilized prior to drying, include sodium plumbite treatment, hypochlorite treatment, treatment with alkaline reagents such as aqueous or alcoholic solutions of sodium hydroxide, potassium, hydroxide, ammonia, lime, with or without the utilization of solubility promoters. Such processes are normally carried out in liquid phase. However, various other processes which may be carried out in either liquid or vapor phase include contact with hydrogen as the treating agent and preferably in the presence of a hydrogenation catalyst. Suitable hydrogenation catalysts are selected from the metals, including metal oxides and sulfides, of group VI(A) and group VIII of the periodic table. The metals include chromium, molybdenum, tungsten, iron, cobalt, nickel, ruthenium, rhodium, palladium, osmium, iridium, and platinum. Examples of suitable sulfides of these metals include molybdenum sulfide, tungsten sulfide, nickel sulfide, cobalt sulfide, platinum sulfide, and mixtures thereof such as cobalt sulfide and molybdenum sulfide, cobalt sulfide, and tungsten sulfide, nickel sulfide and tungsten sulfide, etc. Also, mixtures of oxides such as cobalt molybdate, nickel oxide and molybdenum oxide, etc. may be utilized. These metals, metal sulfides, metal oxides, and mixtures thereof preferably are composited with a carrying material such as inorganic oxides including silica, alumina, magnesia, zirconia, mixtures thereof such as silica-alumina, silica-magnesia, silica-alumina-magnesia, etc. and any of the above promoted with acid acting substances such as halogens, phosphates, etc. The hydrogenation component may also be composited with naturally occurring substances such as bauxite, fuller's earth, kieselguhr, clays, montmorillonite, etc., which may or may not have been activated by special treatment with acids, steam, etc. The treating zone containing the hydrogenation catalyst may be operated at temperatures of from about 100° F. to about 800° F. and pressures of from about atmospheric to about 2000 pounds per square inch or more. The operating conditions in the hydrogenation zone are selected to perform the desired reduction in impurity content and the particular conditions to be utilized will depend upon the amounts of the impurities, the types of molecules in which the impurities occur, the purity of the hydrogen treating agent utilized in said zone, etc. Furthermore, these isomerizable compounds often contain small amounts of olefinic and/or aromatic hydrocarbons as impurities. These impurities are, of course, substantially diminished or removed by the hydrogenation treatment. In any of the above opertaions the particular treating agent including drying agents and hydrogen are not necessarily equivalent and the use of any one or more will depend, as hereinabove set forth, upon the impurities present in the selected isomerizable compounds.

The isomerizable compound after treatment thereof is contacted with an isomerization catalyst prepared by vaporizing a Friedel-Crafts metal halide onto a composite of a refractory oxide containing a hydrogenation component, and heating said thus formed composite at a temperature above about 300° C. for a time sufficient to remove therefrom any unreacted Friedel-Crafts metal halide.

As hereinbefore set forth, applicant has found that especially good catalysts are prepared in accordance with the novel features of the present invention. While the catalysts are prepared from Friedel-Crafts metal halides they do not contain free Friedel-Crafts metal halides as prior art catalysts of this general type have contained. In the preparation of the catalysts of the present invention the refractory oxide containing a hydrogenation component, after vaporization thereon of a Friedel-Crafts metal halide and heating of the thus formed composite, will be increased in weight by from about 2% to about 25% based on the original weight of the refractory oxide containing a hydrogenation component. While the exact increase in weight of the refractory oxide containing a hydrogenation component does not appear to be critical, it has been found that highly active catalysts are obtained when the thus treated refractory oxide has been increased in weight from about 5% to about 20%. As stated hereinabove, the present catalytic composites are prepared from a Friedel-Crafts metal halide but do not contain, after preparation, any free Friedel-Crafts metal halide.

During the preparation and subsequent heating, the Friedel-Crafts metal halide appears to react with the refactory oxide containing a hydrogenation component. The subsequent heating treatment is then carried out at a temperature above that required for vaporization of any free Friedel-Crafts metal halide at the conditions utilized. This and other features of the present invention will be set forth hereinafter in detail.

In the first step in the preparation of catalysts in accordance with the process of the present invention, a Friedel-Crafts metal halide is vaporized onto a refractory oxide containing a hydrogenation component. The amount of Friedel-Crafts metal halide utilized will range from about 5% to about 50% based on the weight of the refractory oxide containing a hydrogenation component, depending on the exact manner of preparation. For example, if a batch type of vaporization method is utilized, about two times as much Friedel-Crafts metal halide per amount of refractory oxide containing a hydrogenation component is used as is desired as weight increase in the final composite. In a continuous vaporization procedure, this amount can be lowered to one which is just slightly greater than the desired net weight increase of the final composite. It is obvious that this amount, in any case, is not critical and may be varied to arrive at the active catalyst resulting therefrom. Various Friedel-Crafts metal halides may be utilized but not necessarily with equivalent results. Examples of such Friedel-Crafts metal halides include aluminum bromide, aluminum chloride, antimony pentachloride, beryllium bromide, beryllium chloride, ferric bromide, ferric chloride, gallium trichloride, stannic bromide, stannic chloride, titanium tetrabromide, titanium tetrachloride, zinc bromide, zinc chloride, and zirconium chloride. Of these Friedel-Crafts metal halides, the Friedel-Crafts aluminum halides are preferred, and aluminum chloride is particularly preferred. This is so not only because of ease in operation in preparing the highly active catalysts in accordance with the process of this invention but also because the thus prepared catalysts have unexpectedly high activity.

In accordance with the present process, these Friedel-Crafts metal halides are vaporized onto a refractory oxide containing a hydrogenation component. Suitable refractory oxides include such substances as silica (a non-metallic refractory oxide), and various refractory metal oxides such as alumina, titanium dioxide, zirconium dioxide, chromia, zinc oxide, silica-alumina, silica-magnesia, silica-alumina-magnesia, chromia-alumina, alumina-boria, silica-zirconia, and various naturally occurring refactory oxides of various states of purity such as bauxite, kaolin or bentonite clay (which may or may not have been acid treated), diatomaceous earth such as kieselguhr, montmorillonite, spinels such as magnesium oxide-alumina spinels or zinc oxide spinels, etc. Of the above-mentioned refractory oxides, alumina is preferred and particularly synthetically prepared gamma-alumina of a high degree of purity.

The above-mentioned refractory oxides have composited therewith a hydrogenation component prior to the vaporization thereon of a Friedel-Crafts metal halide. Suitable hydrogenation components include metals of group VI(B) and VIII of the periodic table including chromium, molybdenum, tungsten, iron, cobalt, nickel, ruthenium, rhodium, palladium, osmium, iridium, and platinum. Of these hydrogenation components, the platinum-group metals are preferred, and of these platinum-group metals, platinum and palladium are particularly preferred. These metals are not necessarily equivalent in the resulting catalysts and of all hydrogenation components, platinum is particularly preferred.

In carrying out the present process, the temperature at which the Friedel-Crafts metal halide is vaporized onto the refractory oxide containing a hydrogenation component will vary in accordance with the particular Friedel-Crafts metal halide utilized. In some cases, since the Friedel-Crafts metal halide decomposes on heating to elevated temperatures, it will be necessary to carry out such vaporization at reduced pressures to preclude such decomposition. However, in most instances the vaporization is carried out either at the boiling point or sublimation point of the particular Friedel-Crafts metal halide or at temperatures not greatly exceeding these points, for example, not greater than 100° C. higher than the boiling point or sublimation point of the particular Friedel-Crafts metal halide utilized. However, in some instances it may be desirable to carry out the vaporization and subsequent heating step at the same temperature and thus such temperatures are also within the generally broad scope of the present invention.

This invention can perhaps be best understood by a description of a specific embodiment thereof. As set forth hereinabove, a particularly preferred refractory oxide for use in preparing the desired catalysts is alumina. Furthermore, of the various known forms of alumina, gamma-alumina is preferred. Furthermore, the alumina is preferably prepared synthetically and is a high degree of purity. The methods of preparation of such synthetic aluminas is well known. For example, they may be prepared by the calcination of alumina gels which commonly are formed by adding a suitable reagent such as ammonium hydroxide, ammonium carbonate, etc., to a salt of aluminum such as aluminum chloride, aluminum nitrate, aluminum sulfate, in an amount to form aluminum hydroxide which is converted to alumina upon drying. It has been found that aluminum chloride generally is preferred as the aluminum salt, not only for convenience in subsequent washing and filtering procedures but also because it appears to give the best results. Alumina gels are also prepared by the reaction of sodium aluminate with a suitable acidic reagent to cause precipitation thereof with the resultant formation of an aluminum hydroxide gel. Synthetic aluminas may also be prepared by the formation of alumina sols, for example, by the reaction of metallic aluminum with hydrochloric acid, which sols can be gelled by suitable precipitation agents such as ammonium hydroxide followed by drying and calcination. In another embodiment, these synthetically prepared aluminas may contain from about 0.01% to about 8% combined halogen, preferably fluorine. These halogenated aluminas may be prepared in various manners, for example, by the addition of a suitable quantity of hydrofluoric acid to an alumina gel prior to drying and calcination thereof. In another manner, aluminum fluoride can be added to alumina gels thus yielding an alumina having the desired quantity of halogen combined therewith. When the synthetically prepared alumina is prepared from aluminum chloride, it is sometimes advantageous and/or desirable to minimize the washings thereof to control the desired amount of chlorine composited with the alumina. In any of the above instances wherein the alumina is prepared from an alumina sol or an alumina gel, the resultant product is calcined to a sufficient temperature to convert the product into gamma-alumina. While the resultant aluminas may contain relatively small amounts of water of hydration, gamma-alumina with or without combined halogen is the preferred synthetically prepared alumina for use as the refractory oxide in the process of the present invention.

As hereinabove set forth, the above synthetically prepared alumina will have a hydrogenation component combined therewith, preferably a platinum-group metal, and particularly platinum. This platinum-group metal, particularly platinum, may be composited with the alumina in any of many well known manners. For example, an ammoniacal solution of chloroplatinic acid may be admixed with the alumina followed by drying. In another method, chloroplatinic acid in the desired quantity can be added to an alumina gel slurry followed by precipitation of the platinum therefrom on the alumina by means of hydrogen sulfide or other sulfiding or precipitation agents. While the quantity of platinum combined with the alumina is not critical, for economic reasons, the amount of platinum is usually kept at a minimum. Thus, large amounts of platinum do not cause detrimental effects. Generally, however, it is preferred to utilize from about 0.01% to about 2% by weight of platinum based on the dry alumina. In another embodiment, the alumina and platinum can be composited by co-precipitation techniques. In such a case, an aqueous solution of the desired amount of platinum salt is admixed with a solution of an aluminum salt followed by the addition thereto of a precipitating agent which will cause co-precipitation. The resultant gel can be dried and calcined to form a gamma-alumina platinum composite which can be formed into the desired size particles.

While the physical form of the refractory oxide containing a hydrogenation component is not critical, generally it is preferred to utilize macro particles so that the final composite may be used as a fixed bed in a reaction zone. Thus, it is desirable to form the synthetically prepared alumina with or without platinum composited therewith into pellets, for example, of 1/16 inch by 1/16 inch or 1/8 inch by 1/8 inch, etc. This can be accomplished readily by grinding the dried alumina gel to a powder followed by pilling thereof by known methods. Alternatively, the particles may be in the form of spheres, or irregularly shaped particles such as result from extrusion. While it is not intended to limit the invention to particles of any particular size, the above-mentioned alumina-platinum composites are definitely preferred.

In carrying out the preferred embodiment of the present process, the above-described alumina-platinum composites have vaporized thereon aluminum chloride. This can be accomplished readily by sublimation of the aluminum chloride onto the surface of the particles. Aluminum chloride sublimes at 178° C. and thus a suitable vaporization temperature will range from about 180° C. to about 275° C. The sublimation can be carried out under pressure, if desired, and also in the presence of diluents such as inert gases including paraffin hydrocarbons, hydrogen, and nitrogen. The amount of aluminum chloride which sublimes onto the above-described particles reaches a maximum at any particular vaporization temperature selected. In addition to vaporizing onto the alumina-platinum composite, the aluminum chloride also reacts therewith evolving hydrogen chloride. However, it is difficult to control the amount of aluminum chloride which reacts Therefore, to insure freedom of the resultant composite from free aluminum chloride, the composite is then heated at a temperature above about 300° C. for a sufficient time to remove therefrom any unreacted aluminum chloride. Since aluminum chloride sublimes at 178° C., this heating treatment in the absence of further added aluminum chloride results in freeing the thus prepared composite from free aluminum chloride. However, since aluminum chloride itself is tenaciously held onto an alumina surface, temperatures at least as high as the 300° C. indicated are required. This heating treatment can accomplish either further reaction of the unreacted aluminum chloride with the alumina-platinum composite, or it can simply accomplish sublimation of any unreacted aluminum chloride from the composite. Some hydrogen chloride evolution is noticed upon vaporization of the aluminum chloride onto the alumina-platinum composite and during the subsequent heating treatment. This evolution is thought to be due to reaction of aluminum chloride with hydroxyl groups on the alumina surface. Thus, the first portion of the aluminum chloride vaporized onto the particles actually may be in the form of oxy-aluminum dichloride which becomes admixed with free aluminum chloride upon further vaporization of the aluminum chloride thereon. However, regardless of whether or not this is so, the final catalyst composite is free from aluminum chloride, and it is the particular sequence of process steps which results in the unusual catalytic properties of the resultant composite. One unusual feature of catalysts which are prepared in the above-described manner is that these catalysts may be utilized for reactions for which it has heretofore been considered necessary to utilized hydrogen halide promoters along with Friedel-Crafts metal halides such as aluminum chloride. While the use of hydrogen halide promoters with the catalysts composition of the present invention is not meant to be excluded thereby, it has usually been found unnecessary to utilize them to obtain satisfactory results with these compositions.

As set forth hereinabove, the composite of refractory oxide containing a hydrogenation component and Friedel-Crafts metal halide is heated at a temperature above about 300° C. for a time sufficient to remove therefrom any unreacted Friedel-Crafts metal halide. The exact temperature to be utilized will depend on the boiling point or sublimation temperature of the particular Friedel-Crafts metal halide utilized. In general, particularly with aluminum chloride, temperatures of about 400° C. to about 600° C. and times of from about 1 to about 48 hours are satisfactory. Furthermore, the refractory oxides containing hydrogenation components as set forth hereinabove are selected as substances suitable as catalysts supports for various reasons. One reason is that these substances, such as an alumina-platinum composite, have high surface areas which appear to have a beneficial effect upon catalyst activity. In many cases, these high surface areas are developed in the preparation of such supports under carefully controlled conditions of heating at specific temperatures for specific periods of time. Therefore, in the heating process step of the present invention, care must be taken so that these high surface areas are not destroyed by the aforesaid heat treatment. Therefore, it is definitely disadvantageous to carry out such heat treatments at temperatures above about 700° C. Of course, it is obvious that such temperatures are interrelated with the time at which such refractory oxides containing hydrogenation components are kept at these temperatures. Therefore, care is exerted in all instances to maintain maximum surface areas during the subsequent heating of the catalyst composites in the process of the present invention.

This heating step can be carried out in the presence of various inert diluent gases. Such gases include nitrogen, hydrogen, and paraffinic hydrocarbons including methane, ethane, etc. These gases do not have an adverse effect on the resultant catalyst activity. When the vaporization step and the heating step are combined, one or more of the above gases may be utilized as the carrier gas for the Friedel-Crafts metal halide as well as providing the proper atmosphere for the heating step.

As hereinabove set forth, one unusual feature of these catalysts is that they may be utilized as catalysts for isomerization reactions for which it has ordinarily been considered necessary to utilize hydrogen halide promoters therewith. While the use of hydrogen halide promoters with the catalyst compositions of the present invention is not meant to be excluded thereby, it has usually been found unnecessary to utilize them to obtain satisfactory results with these compositions. Compounds such as aromatic hydrocarbons and naphthenic hydrocarbons have been shown in the prior art to be cracking suppressors for the isomerization of saturated hydrocarbons reaction. Side reactions such as cracking encountered in the present process with the hereinabove described catalysts are minimized and thus the use of such cracking suppressors has not been found to be necessary. However, if desired, they may be utilized in substantially the same manners as are well known in the prior art.

The process of the present invention is directed towards the isomerization of an isomerizable compound as hereinabove stated. This isomerization is preferably effected in a hydrogen atmosphere. While the use of hydrogen in processes of this general type as a cracking suppressor has been previously disclosed, it is felt that hydrogen pressure or partial pressure is an important variable in the process of this invention. Sufficient hydrogen should be utilized so that the hydrogen to hydrocarbon molar ratio of the reaction zone feed will be within the molar ratio of from about 0.25 to about 10. When smaller amounts of hydrogen are utilized, the catalyst rapidly deactivates and cracking reactions become prominent. The use of too much hydrogen is deterimental since the isomerization can be stopped completely by such means. The hydrogen may be supplied from any convenient source and will generally be recycled within the process so that hydrogen consumption will be for all practical purposes negligable except for the hydrogen consumed when hydrogen is utilized as a treating agent for the impure isomerizable compounds prior to isomerization thereof. The hydrogen may be purified or may be diluted with various inert materials such as nitrogen, methane, ethane, and/or propane.

The operating conditions to be employed in the isomerization zone will depend upon the particular compounds being isomerized and generally will be at temperatures ranging from about 100° C. to about 300° C. although temperatures within the more limited range of from 150° C. to about 250° C. will generally be utilized. The pressure utilized will range from about 50 pounds per square inch to about 1500 pounds per square inch. As hereinabove set forth, the process of the present invention utilizing the above-described catalyst is particularly adapted for a so-called fixed-bed type process. In such a process, the compound or compounds to be isomerized after treating thereof as hereinabove set forth are passed in either an upward or downward flow over the isomerization catalyst along with hydrogen. The reaction products are then separated from hydrogen, which may be recycled, and subjected to fractionation and separation of the desired reaction product. Recovered starting material is recycled within the isomerization circuit so that the overall process yield is high. In such processes the hourly liquid space velocities which are defined as the volume of reactants per unit time per volume of catalyst will be maintained within the general range of from about 0.28 to about 10 and preferably within the range from about 0.5 to about 5. Another means of effecting the isomerization reactions of the present invention is to utilize a fluidized fixed bed of catalyst wherein the reactant or reacants are passed upwardly through a bed of the isomerization catalyst at a sufficient rate to maintain the individual particles of catalyst in a state of hindered settling. However, the rate of passage of the reactant through the bed is not so great as to suspend the catalytic material in the stream of isomerizable compound and carry it out of the reactor. As is readily apparent smaller size particles than hereinabove described are suitable for such a modified operation. If desired, the catalyst may be utilized in the form of so-called micro particles and the process may be effected in a two-zone fluidized transfer process. In such a process when it is desired to regenerate the catalyst or reactivate it by other means, the catalyst may be suspended in a gas stream and conveyed to a second zone wherein it is contacted with reactivating materials such as additional metal halide of the Friedel-Crafts type, after which the reactivated catalyst is returned to the reaction zone where it may be utilized to effect further isomerization reactions. Another suitable two-zone system may be the use of a moving bed wherein a dense bed of catalytic material slowly descends through the reaction zone, is discharged from the lower portion thereof into a reactivation zone from which it is transported again to the top of the bed in the reaction zone to again descend through the reaction zone effecting further isomerization in transit. Regardless of the particular operation employed, the products may be fractionated or otherwise separated to recover the desired product and to separate unconverted material which may be recycled. Hydrogen in the effluent likewise is separated and preferably is recycled. Should catalyst activators as hydrogen halides be utilized, they will also be separated and recycled in a like manner.

The following examples are introduced to illustrate further the novelty and utility of the present invention but with no intention of unduly limiting the same. These examples are carried out in a continuous manner in bench scale apparatus. Driers which are utilized are stainless steel tubes 2 inches in diameter and 24 inches long which are filled with a drying agent. When hydrogen is utilized as a treating agent followed by a drying agent, the hydrogenation catalyst is placed in a stainless steel tube of about 1 inch inside diameter and about 50 inches long. The reactant and hydrogen are then passed through this reactor, a condenser, and a high pressure separator from which the treating hydrogen is vented. The hydrogen treated liquid is passed to the drying agent, and then to the isomerization reaction zone. The isomerization reaction zone reactor is a stainless steel tube similar to that described hereinabove. The hydrocarbon is fed to the treating and isomerization zones by the use of a charge pump at rates to be set forth hereinafter. The hydrogen charge is from a hydrogen cylinder and is dried before use. The reaction products are condensed, cooled to room temperature, and a phase separation is effected in a high pressure receiver. A portion of the hydrogen is recycled. A liquid product is collected, stabilized to remove low boiling hydrocarbons, and the desired boiling range reaction products are analyzed by vapor phase chromatographic or by infrared spectrographic techniques.

EXAMPLE I

This example illustrates the isomerization of n-hexane in the presence of a platinum-aluminum chloride-alumina catalyst. The catalyst was prepared by a general method in which a platinum-alumina composite was first prepared by dissolving aluminum pellets in hydrochloric acid to form a sol containing about 15% aluminum. Hydrofluoric acid was added to the sol so that the final composite contained 0.35% fluorine based on the weight of the dry alumina. The resulting solution was mixed with hexamethylene tetraamine in a continuous mixer and dropped into an oil bath at about 90° C. to form spheres. The spheres were aged in oil, and then in an aqueous solution of ammonia. The washed spheres were then transferred to a drier, dried at about 250° C. and calcined at about 600° C. The synthetically prepared alumina spheres were impregnated with a dilute ammonical solution of chloroplatinic acid. The amount of platinum in this solution was adjusted so that the final composite contained 0.375% platinum by weight based on dry alumina. The thus impregnated composite was calcined in air at a temperature of about 500° C. A sufficient quantity of this platinum-alumina composite was prepared so that it could be used in the preparation of various hereinafter described composites.

Seven hundred and fifty cc. (394 grams) of the above-described platinum-alumina composite was reduced with hydrogen for two hours at 600° C. and then was placed in a glass liner in a rotating autoclave along with 158 grams of anhydrous aluminum chloride. The autoclave was sealed, pressured with 30 pounds per square inch of hydrogen, and heated and rotated for two hours at 250° C. After cooling, the autoclave was opened and the final composite recovered therefrom. This composite weighed 455 grams which indicated that it had gained in weight equivalent to 15.7% aluminum chloride adsorbed thereon. This 455 grams of aluminum chloride impregnated composite was then placed as a fixed bed in a glass tube surrounded by a vertical furnace and heated to 427° C. and maintained at this temperature for two hours time during which a stream of nitrogen was passed thereover. After cooling, it was found that the catalyst had lost an additional 21 grams and thus the net weight increase of the final composite was eqnivalent to 10.2%.

A 75 cc. (41.5 grams) sample of this composite was utilized for the isomerization of n-hexane to isomers thereof. The n-hexane analyzed greater than 98% n-hexane and about 1.0–1.5% methylcyclopentane by weight. In this isomerization study, the n-hexane was first passed through silica gel and then to the isomerization zone containing the hereinabove described catalyst. The silica gel was disposed as a fixed bed in two separate vessels each containing about 1300 cc. thereof. This silica gel treatment was carried out at room temperature and at atmospheric pressure by pumping 75 cc. per hour of the hereinabove described charge upflow through the two silica gel drier vessels arranged in series. The results obtained in the isomerization of such a silica gel treated charge stock are presented in the Table I. Conditions for isomerization included a pressure of 900 p.s.i.g., a liquid hourly space velocity of about 1.0, a hydrogen to hydrocarbon molar ratio of about 6:1, and varying temperatures.

The silica gel driers were changed by removal of the used silica gel and replacement thereof with fresh silica gel at 76 hours on stream, 144 hours on stream, 234 hours on stream, 304 hours on stream, and at 376 hours on stream. It can be noted that the isomerization process was a very stable operation over the period of time on stream. When the plant was shut down after 431 hours on stream, the catalyst was substantially of the same activity as originally. The n-hexane feed went from about 25 F–1 clear and about 55 F–1+3 cc. Octane numbers to a level of about 74 F–1 clear and 94 F–1+3 cc. From these results it is obvious that substantial isomerization of n-hexane to hexane isomers takes place. This isomerization is achieved in the absence of substantial amounts of side reactions and without the utilization of added hydrogen chloride. Furthermore, the temperatures utilized are relatively low. From a calculation of the amount of aluminum chloride present in the reaction zone as weight increase of the platinum-alumina composite, it is found that about 200 barrels of normal hexane have been processed per pound of alumi-

*Table I.—Isomerization of silica gel treated n-hexane in the presence of an aluminum chloride-platinum-alumina catalyst*

| Period No. | 1 | 2 | 3 | 4 | 5 | 6 | 7 | 8 | 9 |
|---|---|---|---|---|---|---|---|---|---|
| On Stream, Hrs. | 11–16 | 21–26 | 31–36 | 41–46 | 51–56 | 61–66 | 71–76 | 81–86 | 91–93 |
| Temperature, ° C. (Block) | 150 | 150 | 150 | 150 | 150 | 150 | 150 | 150 | 150 |
| Rates: | | | | | | | | | |
| Charge, cc. per hour at 60° F. | 79.6 | 73.8 | 73.4 | 76.0 | 69.6 | 78.2 | 73.6 | 76.6 | 74.0 |
| $H_2$, Recycle, s.c.f./hr. | 2.75 | 2.78 | 2.72 | 2.87 | 2.86 | 2.81 | 2.83 | 2.86 | 2.77 |
| Fresh $H_2$, s.c.f./hr. | 0.46 | 0.35 | 0.34 | 0.35 | 0.32 | 0.35 | 0.38 | 0.69 | 0.70 |
| Results, wt. percent $C_5$+Product | 89 | 96 | 99 | 93 | 105 | 89 | 103 | 80 | 103 |
| Octane No., F–1 | 62.3 | 74.2 | ----- | 74.8 | ----- | 75.1 | ----- | 72.8 | ----- |
| Octane No., F–1+3 cc. TEL | 85.2 | 92.2 | ----- | 92.5 | ----- | 93.0 | ----- | 91.3 | ----- |
| Product Analysis: | | | | | | | | | |
| 2,2-Dimethylbutane | 12.0 | 19.9 | 18.8 | 19.2 | 18.7 | 17.9 | 16.3 | 15.2 | 16.1 |
| 2,3-Dimethylbutane+2-Methylpentane | 33.2 | 45.0 | 44.7 | 44.4 | 45.1 | 45.3 | 45.5 | 42.4 | 43.6 |
| 3 Methylpentane | 15.4 | 18.7 | 19.9 | 19.3 | 19.6 | 19.7 | 20.2 | 22.3 | 22.3 |
| Methylcyclopentane | 0.4 | Tr | Tr | 0.4 | 0.5 | 1.5 | 1.4 | 0.4 | Tr |
| Cyclohexane | 0.3 | Tr | Tr | 0.4 | Tr | 0.9 | 1.0 | 0.7 | Tr |
| n-Hexane | 38.7 | 16.4 | 16.6 | 16.3 | 16.1 | 14.7 | 15.6 | 19.0 | 16.1 |
| Total | 100.0 | 100.0 | 100.0 | 100.0 | 100.0 | 100.0 | 100.0 | 100.0 | 100.0 |

| Period No. | 10 | 11 | 12 | 13 | 14 | 15 | 16 | 17 | 18 |
|---|---|---|---|---|---|---|---|---|---|
| On Stream, Hrs. | 99–104 | 109–114 | 119–124 | 129–134 | 139–144 | 154–164 | 174–184 | 194–204 | 214–224 |
| Temperature, ° C. (Block) | 156 | 150 | 160 | 160 | 160 | 160 | 160 | 160 | 160 |
| Rates: | | | | | | | | | |
| Charge, cc. per hour at 60° F. | 72.0 | 78.0 | 71.0 | 76.0 | 75.0 | 76.2 | 75.9 | 77.4 | 83.6 |
| $H_2$, Recycle, s.c.f./hr. | 2.77 | 2.82 | 2.80 | 2.89 | 2.82 | 2.79 | 2.79 | 2.82 | 2.82 |
| Fresh $H_2$, s.c.f./hr. | 0.70 | 0.68 | 0.78 | 0.69 | 0.65 | 0.73 | 0.73 | 0.69 | 0.71 |
| Results, wt. percent $C_5$+Product | 71 | 93 | 82 | 81 | 84 | 72 | 95 | 97 | 96 |
| Octane No., F–1 | ----- | ----- | ----- | 76.7 | ----- | 74.4 | ----- | ----- | ----- |
| Octane No., F–1+3 cc. TEL | ----- | ----- | ----- | 93.6 | ----- | 92.8 | ----- | ----- | ----- |
| Product Analysis: | | | | | | | | | |
| 2,2-Dimethylbutane | 15.7 | 17.4 | ----- | 20.3 | 18.7 | 17.4 | 16.8 | 17.3 | 13.9 |
| 2,3-Dimethylbutane+2-Methylpentane | 44.2 | 44.6 | ----- | 42.9 | 43.8 | 44.0 | 43.8 | 44.0 | 44.7 |
| 3-Methylpentane | 22.0 | 20.7 | ----- | 20.2 | 20.3 | 21.6 | 22.3 | 20.7 | 21.3 |
| Methylcyclopentane | Tr | Tr | ----- | 0.8 | 1.3 | 0.3 | Tr | 0.8 | 1.4 |
| Cyclohexane | Tr | Tr | ----- | 0.4 | 0.7 | Tr | Tr | 0.8 | Tr |
| n-Hexane | 17.0 | 17.3 | ----- | 15.4 | 15.2 | 16.7 | 17.1 | 16.4 | 19.3 |
| Total | 100.0 | 100.0 | ----- | 100.0 | 100.0 | 100.0 | 100.0 | 100.0 | 100.0 |

| Period No. | 19 | 20 | 21 | 22 | 23 | 24 | 25 | 26 | 27 | 28 |
|---|---|---|---|---|---|---|---|---|---|---|
| On stream, Hrs. | 244–254 | 254–264 | 274–284 | 294–304 | 314–324 | 334–344 | 354–364 | 374–384 | 394–404 | 414–424 |
| Temperature, ° C. (Block) | 160 | 160 | 180 | 180 | 180 | 180 | 180 | 180 | 180 | 180 |
| Rates: | | | | | | | | | | |
| Charge, cc. per hour at 60° F. | 76.2 | 71.6 | 73.4 | 72.3 | 72.5 | 74 | 73.7 | 74.9 | 72.6 | 77.0 |
| $H_2$, Recycle, s.c.f./hr. | 2.82 | 2.82 | 2.82 | 2.82 | 2.82 | 2.82 | 2.82 | 2.82 | 2.82 | 2.82 |
| Fresh $H_2$, s.c.f./hr. | 0.72 | 0.72 | 0.69 | 0.71 | 0.70 | 0.70 | 0.71 | 0.70 | 0.71 | 0.69 |
| Results, wt. percent $C_5$+Product | 85 | 97 | 92.3 | 93.8 | 73.9 | 79.0 | 83.4 | 76.2 | 86 | 89 |
| Octane No., F–1 | ----- | 73.3 | 74.0 | ----- | ----- | ----- | ----- | 73.8 | 73.8 | 74.4 |
| Octane No., F–1+3 cc. TEL | ----- | ----- | 93.1 | ----- | ----- | ----- | ----- | 92.3 | 92.3 | 92.6 |
| Product Analysis: | | | | | | | | | | |
| 2,2-Dimethylbutane | 13.6 | 14.0 | 16.0 | 17.0 | 18 | 18 | 16.0 | 15.9 | 16.5 | 19.1 |
| 2,3-Dimethylbutane+2-Methylpentane | 44.5 | 44.8 | 45.0 | 43.0 | 45 | 44 | 46.0 | 43.0 | 45.0 | 44.1 |
| 3-Methylpentane | 21.6 | 22.4 | 22.0 | 23.0 | 22 | 22 | 21.0 | 22.5 | 22.1 | 21.4 |
| Methylcyclopentane | 0.6 | Tr | ----- | Tr | Tr | Tr | ----- | 1.5 | Tr | ----- |
| Cyclohexane | 0.4 | ----- | ----- | Tr | Tr | Tr | ----- | ----- | ----- | ----- |
| n-Hexane | 19.3 | 18.8 | 17.0 | 17.0 | 15 | 16 | 17.0 | 17.1 | 16.4 | 15.4 |
| Total | 100.0 | 100.0 | 100.0 | 100.0 | 100.0 | 100.0 | 100.0 | 100.0 | 100.0 | 100.0 |

num chloride. Prior art aluminum chloride consumption using aluminum chloride plus hydrogen chloride as the catalyst has disclosed maximum aluminum chloride utility of about one pound per hunudred gallons. Thus, the present catalyst is in the neighborhood of about 1000 times more stable and its maximum life had not been reached when the above-described run was terminated.

EXAMPLE II

This example is presented for comparative purposes to Example I. In this example, the isomerization catalyst composite utilized was substantially the same as that for which the preparation has been described in Example I. However, no silica gel treatment of the said n-hexane feed was carried out in this example prior to contact of said n-hexane with the isomerization catalyst. The conditions utilized in the isomerization reaction zone for this example were 900 p.s.i.g., a liquid hourly space velocity of 1.0, a hydrogen to hydrocarbon molar ratio of 6:1 and a temperature of 150° C. The results obtained are presented in the following Table II.

*Table II.—Isomerization of n-hexane in the presence of an aluminum chloride-platinum-alumina composite*

| Period | 29 | 30 | 31 | 32 |
|---|---|---|---|---|
| On Stream, Hrs | 7–12 | 17–22 | 27–32 | 57–62 |
| Temperature, ° C | 150 | 150 | 150 | 150 |
| Rates: | | | | |
| Charge, cc./hr. @ 60° F | 67 | 73 | 73 | 75 |
| $H_2$, Recycle, s.c.f./hr | 2.55 | 2.55 | 2.55 | 2.55 |
| $H_2$, Fresh, s.c.f./hr | 0.13 | 0.13 | 0.13 | 0.13 |
| Results: | | | | |
| Octane No. F–1 | 69.2 | ------- | ------- | ------- |
| Octane No. F–1+3 cc. TEL | 88.0 | ------- | ------- | ------- |
| Vapor Phase Analysis— | | | | |
| 2,2-Dimethylbutane | 15.0 | 14.7 | 3.7 | 3.0 |
| 2,3-Dimethylbutane+2-methylpentane | 37.7 | 40.4 | 29.2 | 19.9 |
| 3-Methylpentane | 17.3 | 18.7 | 13.7 | 9.4 |
| n-Hexane | 27.8 | 23.7 | 51.1 | 64.4 |
| Methylcyclopentane | 1.2 | 1.4 | 1.3 | 1.4 |
| Cyclohexane | 1.0 | 1.1 | 1.0 | 1.4 |
| Total | 100.0 | 100.0 | 100.0 | 100.0 |

From the above results it is obvious that the catalyst had no stability with time for the isomerization of the same n-hexane as utilized in Example I. The only difference between the two experiments was that no silica gel pretreatment was utilized in this example. The n-hexane content of the effluent increased from a minimum of 23.7% to 64.4% over a period of about 40 hours time. Similarly, the conversion of hexane to isomers thereof decreased from 70% to about 32.8% over the same period. The catalyst in this example was obviously not stable due to impurities in the feed and this type of an operation cannot be used economically for conversion of n-hexane. The initial activity of the catalyst shows substantial conversion, however.

EXAMPLE III

This example illustrates the effectivenesss of a combination process for the isomerization of n-hexane in which process the n-hexane is treated with hydrogen in the presence of a hydrogenation catalyst followed by treatment with a drying agent. The hydrogenation catalyst utilized was a composite of metallic nickel and kieselguhr containing about 65% nickel by weight. Two hundred cc. of this nickel hydrogenation catalyst was placed in a reactor as described hereinabove and the n-hexane passed thereover in the presence of hydrogen at 900 p.s.i.g., 200° C., 1.0 liquid hourly space velocity, and utilizing a hydrogen to hydrocarbon molar ratio of 1:1. The reactor effluent after separation of the hydrogen therefrom was then passed downflow at room temperature and atmospheric pressure was 1300 cc. of calcium sulfate or Drierite and then collected in an n-hexane feed zone for charging to the isomerization reactor. The isomerization catalyst utilized in the experiment was the same as that described hereinabove in Example I. In this experiment 75 cc. (41.6 grams) of the isomerization catalyst was utilized. Isomerization reaction conditions included 900 p.s.i.g., a liquid hourly space velocity of about 1.0, and a hydrogen to hydrocarbon molar ratio of 6:1. The results obtained are presented in Table III.

*Table III.—Isomerization of n-hexane utilizing hydrogen treatment in the presence of a nickel hydrogenation catalyst followed by calcium sulfate and an isomerization catalyst comprising alumina-platinum-aluminum chloride*

| Period No. | 33 | 34 | 35 | 36 | 37 | 38 | 39 | 40 | 41 |
|---|---|---|---|---|---|---|---|---|---|
| On Stream, Hrs | 6–12 | 15–20 | 30–40 | 50–60 | 70–80 | 90–100 | 111–121 | 131–138 | 220–230 |
| Temperatures, ° C.: Block | 150 | 150 | 150 | 150 | 150 | 150 | 150 | 150 | 150 |
| Rates: | | | | | | | | | |
| Charge, cc. per hour at 60° F | 78.4 | 74 | 72.7 | 72.8 | 73.9 | 75 | 75 | 74.0 | 84.1 |
| $H_2$, Recycle s.c.f./hr | 2.84 | 2.86 | 2.86 | 2.80 | 2.89 | 2.8 | 2.8 | 2.80 | 2.83 |
| $H_2$, Added s.c.f./hr | 0.67 | 0.72 | 0.74 | 0.70 | 0.67 | 0.7 | 0.7 | 0.33 | 0.35 |
| Results, wt. percent $C_5$+Product | 95 | 95.5 | 102.5 | 101.6 | 98.2 | ------- | ------- | ------- | ------- |
| Octane No. F–1 | ------- | 76.7 | ------- | 77.1 | ------- | 77.2 | ------- | ------- | 77.4 |
| Octane No. F–1+3 cc. TEL | ------- | 94.1 | ------- | 94.3 | ------- | ------- | ------- | ------- | 94.4 |
| Product, Analysis: | | | | | | | | | |
| 2,2-Dimethylbutane | 19.0 | 24.5 | 25.3 | 25.0 | 23.2 | 24.2 | 23.7 | 22.3 | 22.4 |
| 2,3-Dimethylbutane+2-methylpentane | 38.3 | 42.9 | 42.0 | 41.9 | 41.3 | 41.4 | 41.8 | 42.6 | 42.8 |
| 3-Methylpentane | 17.8 | 19.3 | 18.7 | 19.0 | 19.6 | 19.7 | 19.9 | 20.1 | 19.5 |
| n-Hexane | 23.3 | 13.3 | 12.7 | 12.6 | 13.3 | 13.4 | 13.4 | 13.6 | 13.0 |
| Methylcyclopentane | 0.9 | ------- | 0.9 | 0.9 | 1.6 | 0.8 | 0.9 | 1.0 | 1.5 |
| Cyclohexane | 0.7 | ------- | 0.4 | 0.6 | 1.0 | 0.5 | 0.3 | 0.4 | 0.8 |
| Total | 100.0 | 100.0 | 100.0 | 100.0 | 100.0 | 100.0 | 100.0 | 100.0 | 100.0 |

The above results illustrate effective isomerization over long periods of time with accompanying catalyst stability. After the initial period, the n-hexane content of the plant effluent is constant in the neighborhood of about 13.5%. The production of 2,2-dimethylbutane is exceedingly high yielding a product of high octane number with excellent tetraethyl lead response. Here again, the operability and utility of the process of this invention is illustrated in comparison to the instability illustrated in Example II. In this experiment, the results obtained are at a somewhat higher activity level than in Example II due to the effectiveness of the utilization of both hydrogen and a drying agent in the treating step.

I claim as my invention:

1. A process for the isomerization of an isomerizable hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerizing temperature not in excess of about 300° C., with a catalyst prepared by vaporizing a Friedel-Crafts metal halide onto a composite of a refractory oxide containing a hydrogenation component, and heating said thus formed composite at a temperature above about 300° C. for a time sufficient to remove therefrom any unreacted Friedel-Crafts metal halide.

2. A process for the isomerization of an isomerizable saturated hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts metal halide onto a composite of a refractory metal oxide containing a hydrogenation component, and heating said thus formed composite at a temperature above about 300° C. for a time sufficient to remove therefrom any unreacted Friedel-Crafts metal halide.

3. A process for the isomerization of an isomerizable acyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts metal halide onto a composite of a refractory metal oxide containing a hydrogenation component, and heating said thus formed composite at a temperature above about 300° C. for a time sufficient to remove therefrom any unreacted Friedel-Crafts metal halide.

4. A process for the isomerization of an isomerizable cyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts metal halide onto a composite of a refractory metal oxide containing a hydrogenation component, and heating said thus formed composite at a temperature above about 300° C. for a time sufficient to remove therefrom any unreacted Friedel-Crafts metal halide.

5. A process for the isomerization of an isomerizable hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions. including an isomerization temperature of from about 100° C. to about 300° C., with a catalyst prepared by vaporizing a Friedel-Crafts metal halide onto a composite of a refractory metal oxide containing a platinum group metal, and heating said thus formed composite at a temperature above about 300° C. for a time sufficient to remove therefrom any unreacted Friedel-Crafts metal halide.

6. A process for the isomerization of an isomerizable saturated hydrocarbon containing isomerization catalyst deactivating quantities of compounds of oxygen, nitrogen, and sulfur which comprises treating said hydrocarbon with a drying agent at treating conditions and and contacting said hydrocarbon at isomerization conditions, including an isomerization temperature of from about 100° to about 300° C., with a catalyst prepared by vaporizing a Friedel-Crafts metal halide onto a composite of a refractory metal oxide containing a platinum group metal, and heating said thus formed composite at a temperature above about 300° C. for a time sufficient to remove therefrom any unreacted Friedel-Crafts metal halide.

7. A process for the isomerization of an isomerizable acyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts metal halide onto a composite of a refractory metal oxide containing a platinum group metal, and heating said thus formed composite at a temperature above about 300° C. for a time sufficient to remove therefrom any unreacted Friedel-Crafts metal halide.

8. A process for the isomerization of an isomerizable cyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts metal halide onto a composite of a refractory metal oxide containing a platinum group metal, and heating said thus formed composite at a temperature above about 300° C. for a time sufficient to remove therefrom any unreacted Friedel-Crafts metal halide.

9. A process for the isomerization of an isomerizable hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts aluminum halide onto a composite of a refractory metal oxide containing platinum, and heating said thus formed composite at a temperature above about 300° C. for a time sufficient to remove therefrom any unreacted Friedel-Crafts aluminum halide.

10. A process for the isomerization of an isomerizable saturated hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts aluminum halide onto a composite of a refractory metal oxide containing platinum, and heating said thus formed composite at a temperature above about 300° C. for a time sufficient to remove therefrom any unreacted Friedel-Crafts aluminum halide.

11. A process for the isomerization of an isomerizable acyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts aluminum halide onto a composite of a refractory metal oxide containing platinum, and heating said thus formed composite at a temperature above about 300° C. for a time sufficient to remove therefrom any unreacted Friedel-Crafts aluminum halide.

12. A process for the isomerization of an isomerizable cyclic paraffin hydrocarbon containing isomerization catalyst deactivating quantities of compounds of oxygen, nitrogen, and sulfur which comprises treating said hydrocarbon with a drying agent at treating conditions, and contacting said hydrocarbon at isomerization conditions, including an isomerization temperature of from about 100° C. to about 300° C., with a catalyst prepared by vaporizing a Friedel-Crafts aluminum halide onto a composite of a refractory metal oxide containing platinum, and heating said thus formed composite at a temperature above about 300° C. for a time sufficient to remove therefrom any unreacted Friedel-Crafts aluminum halide.

13. A process for the isomerization of an isomerizable hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions, including an isomerization temperature of from about 100° C. to about 300° C., with a catalyst prepared by subliming aluminum chloride onto a composite of alumina containing platinum, and heating said thus formed composite at a temperature above about 300° C. for a time sufficient to remove therefrom any unreacted aluminum chloride.

14. A process for the isomerization of an isomerizable saturated hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions, including an isomerization temperature of from about 100° C. to about 300° C., with a catalyst prepared by subliming aluminum chloride onto a composite of alumina containing platinum, and heating said thus formed composite at a temperature above about 300° C. for a time sufficient to remove therefrom any unreacted aluminum chloride.

15. A process for the isomerization of an isomerizable acyclic paraffin hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions, including an isomerization temperature of from about 100° C. to about 300° C., with a catalyst prepared by subliming aluminum chloride onto a composite of alumina containing platinum, and heating said thus formed composite at a temperature above about 300° C. for a time sufficient to remove therefrom any unreacted aluminum chloride.

16. A process for the isomerization of an isomerizable cyclic paraffin hydrocarbon containing isomerization catalyst deactivating quantities of compounds of oxygen, nitrogen, and sulfur which comprises treating said hydrocarbon at treating conditions with hydrogen, then treating with a drying agent, and contacting said hydrocarbon at isomerization conditions, including an isomerization temperature of from about 100° C. to about 300° C., with a catalyst prepared by subliming aluminum chloride onto a composite of alumina containing platinum, and heating said thus formed composite at a temperature above about 300° C. for a time sufficient to remove therefrom any unreacted aluminum chloride.

17. A process for the isomerization of n-butane containing isomerization catalyst deactivating quantities of compounds of oxygen, nitrogen, and sulfur which comprises treating said n-butane at treating conditions with hydrogen in the presence of a hydrogenation catalyst, then treating with a drying agent, and contacting said n-butane at isomerization conditions, including an isomerization temperature of from about 100° C. to about 300° C., with a catalyst prepared by subliming aluminum chloride onto a composite of gamma-alumina containing platinum, and heating said thus formed composite at a temperature from about 400° C. to about 600° C. for a time from about 1 to about 48 hours to remove therefrom any unreacted aluminum chloride.

18. A process for the isomerization of n-pentane containing isomerization catalyst deactivating quantities of compounds of oxygen, nitrogen, and sulfur which comprises treating said n-pentane at treating conditions with hydrogen in the presence of a hydrogenation catalyst, then treating with a drying agent, and contacting said n-pentane at isomerization conditions, including an isomerization temperature of from about 100° C. to about 300° C., with a catalyst prepared by subliming aluminum chloride onto a composite of gamma-alumina containing platinum, and heating said thus formed composite at a temperature from about 400° C. to about 600° C. for a time from about 1 to about 48 hours to remove therefrom any unreacted aluminum chloride.

19. A process for the isomerization of n-hexane containing isomerization catalyst deactivating quantities of compounds of oxygen, nitrogen, and sulfur which comprises treating said n-hexane at treating conditions with hydrogen in the presence of a hydrogenation catalyst, then treating with a drying agent, and contacting said n-hexane at isomerization conditions, including an isomerization temperature of from about 100° C. to about 300° C., with a catalyst prepared by subliming aluminum chloride onto a composite of gamma-alumina containing platinum, and heating said thus formed composite at a temperature from about 400° C. to about 600° C. for a time from about 1 to about 48 hours to remove therefrom any unreacted aluminum chloride.

20. A process for the isomerization of methylcyclopentane containing isomerization catalyst deactivating quantities of compounds of oxygen, nitrogen, and sulfur which comprises treating said methylcyclopentane at treating conditions with hydrogen in the presence of a hydrogenation catalyst, then treating with a drying agent, and contacting said methylcyclopentane at isomerization conditions, including an isomerization temperature of from about 100° C. to about 300° C., with a catalyst prepared by subliming aluminum chloride onto a composite of gamma-alumina containing platinum, and heating said thus formed composite at a temperature from about 400° C. to about 600° C. for a time from about 1 to about 48 hours to remove therefrom any unreacted aluminum chloride.

References Cited in the file of this patent

UNITED STATES PATENTS

| | | |
|---|---|---|
| 2,338,472 | Van Peski | Jan. 4, 1944 |
| 2,493,499 | Perry | Jan. 3, 1950 |
| 2,550,531 | Ciapetta | Apr. 24, 1951 |
| 2,717,230 | Murray et al. | Sept. 6, 1955 |
| 2,758,064 | Haensel | Aug. 7, 1956 |
| 2,762,781 | Nozaki et al. | Sept. 11, 1956 |
| 2,766,179 | Fenske et al. | Oct. 9, 1956 |
| 2,834,823 | Patton et al. | May 13, 1958 |
| 2,840,527 | Brennan et al. | June 24, 1958 |